US008260849B2

(12) United States Patent
Shkvarchuk et al.

(10) Patent No.: US 8,260,849 B2
(45) Date of Patent: *Sep. 4, 2012

(54) SYNCHRONOUS INTERFACE TO ASYNCHRONOUS PROCESSES

(75) Inventors: Taras Shkvarchuk, Concord, CA (US); Alexander Lerner, San Francisco, CA (US); Thomas Nabiel Boulos, Corte Madera, CA (US)

(73) Assignee: salesforce.com, inc., San Francisco, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/777,164

(22) Filed: May 10, 2010

(65) Prior Publication Data

US 2010/0223301 A1    Sep. 2, 2010

Related U.S. Application Data

(63) Continuation of application No. 10/808,212, filed on Mar. 23, 2004, now Pat. No. 7,739,351.

(51) Int. Cl.
*G06F 15/16* (2006.01)
(52) U.S. Cl. .......... 709/203; 709/220; 709/223
(58) Field of Classification Search .......... 707/100; 709/217, 220, 223, 203
See application file for complete search history.

(56) References Cited

U.S. PATENT DOCUMENTS

| | | |
|---|---|---|
| 5,119,377 A | 6/1992 | Cobb et al. |
| 5,222,234 A | 6/1993 | Wang et al. |
| 5,255,389 A | 10/1993 | Wang |
| 5,333,312 A | 7/1994 | Wang |
| 5,826,017 A | 10/1998 | Holzmann |
| 5,850,518 A | 12/1998 | Northrup |
| 5,903,652 A | 5/1999 | Mital |
| 6,032,118 A | 2/2000 | Tello et al. |
| 6,055,513 A | 4/2000 | Katz et al. |
| 6,065,082 A | 5/2000 | Blair et al. |
| 6,073,142 A | 6/2000 | Geiger et al. |
| 6,091,714 A | 7/2000 | Sensel et al. |
| 6,148,411 A | 11/2000 | Ichinohe et al. |
| 6,226,623 B1 | 5/2001 | Schein et al. |
| 6,230,203 B1 | 5/2001 | Koperda et al. |
| 6,233,565 B1 | 5/2001 | Lewis et al. |
| 6,256,667 B1 | 7/2001 | Wanghlander et al. |
| 6,260,062 B1 | 7/2001 | Davis et al. |
| 6,292,789 B1 | 9/2001 | Schutzer |
| 6,304,969 B1 | 10/2001 | Wasserman et al. |

(Continued)

OTHER PUBLICATIONS

US Office Action dated Sep. 21, 2004 issued in U.S. Appl. No. 10/727,089 (7,305,454).

(Continued)

*Primary Examiner* — Joseph Avellino
*Assistant Examiner* — Marshall McLeod
(74) *Attorney, Agent, or Firm* — Weaver Austin Villeneuve & Sampson LLP (57) ABSTRACT

Methods and apparatus, including computer program products, implementing and using techniques for selectively accessing one or more web services from a client machine, the one or more web services and the client machine being accessible over a network. A request for information is received from a client machine with a conversion engine. The request is received over a synchronous interface. The request is processed in the conversion engine. The processed request is transmitted over an asynchronous interface from the conversion engine to at least one web service. Methods and apparatus, including computer program products, for converting a web service description language file for a synchronous web service into a web service description language file for an asynchronous client machine are also described.

34 Claims, 3 Drawing Sheets

U.S. PATENT DOCUMENTS

| | | |
|---|---|---|
| 6,314,468 B1 | 11/2001 | Murphy et al. |
| 6,336,135 B1 | 1/2002 | Niblett et al. |
| 6,338,050 B1 | 1/2002 | Conklin et al. |
| 6,351,739 B1 | 2/2002 | Egendorf |
| 6,356,529 B1 | 3/2002 | Zarom |
| 6,397,197 B1 | 5/2002 | Gindlesperger |
| 6,397,254 B1 | 5/2002 | Northrup |
| 6,421,705 B1 | 7/2002 | Northrup |
| 6,438,594 B1 | 8/2002 | Bowman-Amuah |
| 6,449,634 B1 | 9/2002 | Capiel |
| 6,470,357 B1 | 10/2002 | Garcia, Jr. et al. |
| 6,470,385 B1 | 10/2002 | Nakashima et al. |
| 6,499,108 B1 | 12/2002 | Johnson |
| 6,526,044 B1 | 2/2003 | Cookmeyer et al. |
| 6,529,489 B1 | 3/2003 | Kikuchi et al. |
| 6,546,413 B1 | 4/2003 | Northrup |
| 6,549,944 B1 | 4/2003 | Weinberg et al. |
| 6,587,838 B1 | 7/2003 | Esposito et al. |
| 6,633,630 B1 | 10/2003 | Owens et al. |
| 6,651,087 B1 | 11/2003 | Dennis |
| 6,665,393 B1 | 12/2003 | Johnson et al. |
| 6,671,713 B2 | 12/2003 | Northrup |
| 6,671,746 B1 | 12/2003 | Northrup |
| 6,704,768 B1 | 3/2004 | Zombek et al. |
| 6,714,987 B1 | 3/2004 | Amin et al. |
| 6,718,380 B1 | 4/2004 | Mohaban et al. |
| 6,735,621 B1 | 5/2004 | Yoakum et al. |
| 6,763,104 B1 | 7/2004 | Judkins et al. |
| 6,813,278 B1 | 11/2004 | Swartz et al. |
| 6,857,072 B1 | 2/2005 | Schuster et al. |
| 6,868,143 B1 | 3/2005 | Menon et al. |
| 6,874,011 B1 | 3/2005 | Spielman et al. |
| 6,877,023 B1 | 4/2005 | Maffeis et al. |
| 6,885,736 B2 | 4/2005 | Uppaluru |
| 6,886,026 B1 | 4/2005 | Hanson |
| 6,917,962 B1 | 7/2005 | Cannata et al. |
| 6,925,488 B2 | 8/2005 | Bantz et al. |
| 6,925,595 B1 | 8/2005 | Whitledge et al. |
| 6,934,532 B2 | 8/2005 | Coppinger et al. |
| 6,948,063 B1 | 9/2005 | Ganesan et al. |
| 6,952,717 B1 | 10/2005 | Monchilovich et al. |
| 6,965,878 B1 | 11/2005 | Heuring |
| 7,028,312 B1 | 4/2006 | Merrick et al. |
| 7,035,202 B2 | 4/2006 | Callon |
| 7,072,983 B1 | 7/2006 | Kanai et al. |
| 7,082,532 B1 | 7/2006 | Vick et al. |
| 7,088,727 B1 | 8/2006 | Short et al. |
| 7,099,950 B2 | 8/2006 | Jones et al. |
| 7,127,613 B2 | 10/2006 | Pabla et al. |
| 7,152,204 B2 | 12/2006 | Upton |
| 7,249,195 B2 | 7/2007 | Panec |
| 7,254,614 B2 | 8/2007 | Mulligan et al. |
| 7,305,454 B2 | 12/2007 | Reese et al. |
| 7,516,191 B2 | 4/2009 | Brouk et al. |
| 7,644,170 B2 | 1/2010 | Clarke et al. |
| 7,689,711 B2 | 3/2010 | Brouk et al. |
| 7,739,351 B2 | 6/2010 | Shkvarchuk et al. |
| 7,788,399 B2 | 8/2010 | Brouk et al. |
| 2001/0005358 A1 | 6/2001 | Shiozawa |
| 2001/0029478 A1 | 10/2001 | Laster et al. |
| 2002/0013854 A1 | 1/2002 | Eggleston et al. |
| 2002/0019797 A1 | 2/2002 | Stewart et al. |
| 2002/0029201 A1 | 3/2002 | Barzilai et al. |
| 2002/0049815 A1 | 4/2002 | Dattatri |
| 2002/0058277 A1 | 5/2002 | Bathe et al. |
| 2002/0087371 A1 | 7/2002 | Abendroth |
| 2002/0091533 A1 | 7/2002 | Ims et al. |
| 2002/0107957 A1 | 8/2002 | Zargham et al. |
| 2002/0111922 A1 | 8/2002 | Young et al. |
| 2002/0116454 A1 | 8/2002 | Dyla et al. |
| 2002/0138166 A1 | 9/2002 | Mok et al. |
| 2002/0143819 A1 | 10/2002 | Han et al. |
| 2002/0161611 A1 | 10/2002 | Price et al. |
| 2003/0018808 A1 | 1/2003 | Brouk et al. |
| 2003/0037250 A1 | 2/2003 | Walker et al. |
| 2003/0041178 A1 | 2/2003 | Brouk et al. |
| 2003/0053459 A1 | 3/2003 | Brouk et al. |
| 2003/0058277 A1 | 3/2003 | Bowman-Amuah |
| 2003/0126136 A1 | 7/2003 | Omoigui |
| 2003/0191816 A1 | 10/2003 | Landress et al. |
| 2004/0019696 A1 | 1/2004 | Scott et al. |
| 2004/0078373 A1 | 4/2004 | Ghoneimy et al. |
| 2004/0117428 A1 | 6/2004 | Surma et al. |
| 2004/0162741 A1 | 8/2004 | Flaxer et al. |
| 2004/0162918 A1 | 8/2004 | Freidman et al. |
| 2004/0167986 A1 | 8/2004 | Gilfix et al. |
| 2004/0167987 A1 | 8/2004 | Reese |
| 2004/0186891 A1 | 9/2004 | Panec et al. |
| 2004/0205216 A1 | 10/2004 | Ballinger et al. |
| 2004/0243574 A1 | 12/2004 | Giroux et al. |
| 2005/0005164 A1 | 1/2005 | Syiek et al. |
| 2005/0039040 A1 | 2/2005 | Ransom et al. |
| 2005/0080914 A1 | 4/2005 | Lerner et al. |
| 2005/0086297 A1 | 4/2005 | Hinks et al. |
| 2005/0086360 A1 | 4/2005 | Mamou et al. |
| 2005/0086594 A1 | 4/2005 | Schlimmer et al. |
| 2005/0138210 A1 | 6/2005 | Shkvarchuk et al. |
| 2005/0166209 A1 | 7/2005 | Merrick et al. |
| 2005/0228863 A1 | 10/2005 | Palmeri et al. |
| 2005/0234928 A1 | 10/2005 | Shkvarchuk |
| 2005/0256934 A1 | 11/2005 | Motoyama |
| 2006/0031225 A1 | 2/2006 | Palmeri et al. |
| 2006/0155871 A1 | 7/2006 | Ilkka et al. |
| 2006/0173951 A1 | 8/2006 | Arteaga et al. |
| 2006/0240396 A1 | 10/2006 | Foo et al. |
| 2007/0143455 A1 | 6/2007 | Gorman et al. |
| 2008/0016242 A1 | 1/2008 | Panec et al. |
| 2008/0052775 A1 | 2/2008 | Sandhu et al. |
| 2009/0019534 A1 | 1/2009 | Bakshi et al. |
| 2010/0041380 A1 | 2/2010 | Hewes et al. |

OTHER PUBLICATIONS

US Office Action dated Jun. 2, 2005 issued in U.S. Appl. No. 10/727,089 (7,305,454).

US Office Action Final dated Nov. 28, 2005 issued in U.S. Appl. No. 10/727,089 (7,305,454).

US Office Action dated Jul. 3, 2006 issued in U.S. Appl. No. 10/727,089 (7,305,454).

US Office Action Final dated Jan. 17, 2007 issued in U.S. Appl. No. 10/727,089 (7,305,454).

US Office Notice of Allowance dated Jun. 29, 2007 issued in U.S. Appl. No. 10/727,089 (7,305,454).

US Office Action dated Sep. 21, 2004 issued in U.S. Appl. No. 10/728,356 (7,249,195).

US Office Action dated Jun. 6, 2005 issued in U.S. Appl. No. 10/728,356 (7,249,195).

US Office Action Final dated Sep. 30, 2005 issued in U.S. Appl. No. 10/728,356 (7,249,195).

US Office Action dated May 24, 2006 issued in U.S. Appl. No. 10/728,356 (7,249,195).

US Notice of Allowance dated May 21, 2007 issued in U.S. Appl. No. 10/728,356 (7,249,195).

US Office Action dated May 26, 2009 issued in U.S. Appl. No. 11/773,931.

US Office Action Final dated Feb. 1, 2010 issued in U.S. Appl. No. 11/773,931.

US Office Action dated Mar. 26, 2008 issued in U.S. Appl. No. 10/742,513.

US Office Action Final dated Apr. 16, 2010 issued in U.S. Appl. No. 10/742,513.

US Office Action dated Dec. 6, 2007 issued in U.S. Appl. No. 10/808,212.

US Office Action Final dated Aug. 7, 2008 issued in U.S. Appl. No. 10/808,212.

US Office Action dated Mar. 13, 2009 issued in U.S. Appl. No. 10/808,212.

US Notice of Allowance dated Sep. 21, 2009 issued in U.S. Appl. No. 10/808,212.

US Supplemental Notice of Allowability and Examiner Interview Summary dated Dec. 2, 2009 issued in U.S. Appl. No. 10/808,212.

US Notice of Allowance dated Feb. 5, 2010 issued in U.S. Appl. No. 10/808,212.

US Office Action dated Dec. 14, 2004 issued in U.S. Appl. No. 09/820,966.
US Office Action Final dated May 19, 2005 issued in U.S. Appl. No. 09/820,966.
US Office Action dated Jun. 20, 2005 issued in U.S. Appl. No. 09/820,966.
US Office Action Final dated Sep. 30, 2005 issued in U.S. Appl. No. 09/820,966.
US Office Action dated Jul. 3, 2006 issued in U.S. Appl. No. 09/820,966.
US Office Action Final dated Apr. 18, 2007 issued in U.S. Appl. No. 09/820,966.
US Office Action dated Aug. 27, 2007 issued in U.S. Appl. No. 09/820,966.
US Office Action Final dated Apr. 16, 2008 issued in U.S. Appl. No. 09/820,966.
US Office Action dated Jan. 9, 2009 issued in U.S. Appl. No. 09/820,966.
US Notice of Allowance dated Nov. 16, 2009 issued in U.S. Appl. No. 09/820,966.
US Office Action dated Feb. 9, 2005 issued in U.S. Appl. No. 09/820,964.
US Office Action Final dated Jul. 13, 2005 issued in U.S. Appl. No. 09/820,964.
US Advisory Action dated Sep. 20, 2005 issued in U.S. Appl. No. 09/820,964.
US Office Action dated Dec. 28, 2005 issued in U.S. Appl. No. 09/820,964.
US Office Action Final dated Jun. 27, 2006 issued in U.S. Appl. No. 09/820,964.
US Advisory Action dated Nov. 20, 2006 issued in U.S. Appl. No. 09/820,964.
US Office Action dated Jan. 25, 2007 issued in U.S. Appl. No. 09/820,964.
US Office Action Final dated Jul. 10, 2007 issued in U.S. Appl. No. 09/820,964.
US Advisory Action dated Sep. 20, 2007 issued in U.S. Appl. No. 09/820,964.
US Office Action dated Dec. 27, 2007 issued in U.S. Appl. No. 09/820,964.
US Office Action Final dated Sep. 3, 2008 issued in U.S. Appl. No. 09/820,964.
US Office Action dated Mar. 30, 2009 issued in U.S. Appl. No. 09/820,964.
US Examiner Interview Sunnnary dated Jul. 24, 2009 issued in U.S. Appl. No. 09/820,964.
US Office Action Final dated Nov. 12, 2009 issued in U.S. Appl. No. 09/820,964.
US Examiner Interview Summary dated Apr. 27, 2010 issued in U.S. Appl. No. 09/820,964.
US Notice of Allowance dated May 24, 2010 issued in U.S. Appl. No. 09/820,964.
US Office Action dated Jul. 15, 2010 issued in U.S. Appl. No. 09/820,964.
US Office Action dated Oct. 26, 2004 issued in U.S. Appl. No. 09/820,965.
US Office Action dated Jun. 6, 2005 issued in U.S. Appl. No. 09/820,965.
US Office Action Final dated Sep. 28, 2005 issued in U.S. Appl. No. 09/820,965.
US Examiner's Interview Summary dated Aug. 3, 2005 issued in U.S. Appl. No. 09/820,965.
US Office Action dated Jun. 14, 2006 issued in U.S. Appl. No. 09/820,965.
US Office Action dated Dec. 28, 2006 issued in U.S. Appl. No. 09/820,965.
US Office Action Final dated Jul. 11, 2007 issued in U.S. Appl. No. 09/820,965.
US Examiner Interview Summary dated Oct. 9, 2007 issued in U.S. Appl. No. 09/820,965.
US Office Action dated Dec. 28, 2007 issued in U.S. Appl. No. 09/820,965.
US Notice of Allowance and Examiner's Amendment dated Sep. 8, 2008 issued in U.S. Appl. No. 09/820,965.
US Notice of Allowance dated Dec. 18, 2008 issued in U.S. Appl. No. 09/820,965.
US Office Action dated Jan. 22, 2009 issued in U.S. Appl. No. 09/820,965.
US Office Action dated Feb. 3, 2009 issued in U.S. Appl. No. 09/820,965.
US Office Action dated Feb. 12, 2009 issued in U.S. Appl. No. 09/820,965.
US Office Action dated Feb. 25, 2009 issued in U.S. Appl. No. 09/820,965.
BizTalk Framework Overview (2000) downloaded from Biztalk.org website at http://www.biztalk.org/Biztalk/framework.asp; Retrieved from internet on Nov. 8, 2000, 3 pages.
Coblist: -Cob: Welcome to my photo album! (2000) retrieved from internet at http://www.deatech.com/natural/ coblist/coblist-we/2000/0484.html; dated Sep. 25, 2000, pp. 1-2.
CrossGAIN: A New Foundation for the Web (2000), overview downloaded from Crossgain.com website at http://www.crossgain.com; Retrieved from internet on Sep. 22, 2000, 1 page.
CrossWeave™—Extending the Enterprise (2001), company overview downloaded from CrossWeave.com website at http://www.crossweave.com/ company_overview.html; Retrieved from internet on Apr. 1, 2002, 1 page.
ebXML: Creating a Single Global Electronic Market (2000) Oasis Un Cefact, copyright ebXML 2000, ebXML Technical Architecture Team, Oct. 17, 2000, 46 pages.
"Evite.com Launches Free Web-based Group Activity Organizer," retrieved from the Internet at www.proquest.com, *PR Newswire*, ProQuest Doc. ID: 43258854, Jul. 19, 1999, pp. 1-2.
"Evite Relics on MySQL to Deliver Millions of Invitations," retrieved from www.mysql.com, *My SQL, The World's Most Popular Open Source Database*, MySQL.com, 1998, 4 pages.
"Evite Tour," Mar. 2001, retrieved from the Internet at http://web/archive.org/web/2001027073617/www.evite.com/tour?printAll+ok, Evite Mar. 2001, pp. 1-9.
"Excite@Home: Excite's #1 webshots provides users with comprehensive photo capabilities; Unveiling "My Photos" where Excite users can create personal albums, share photos, search photos and order quality prints by Ofoto," [Retrieved from internet at www.proquest.com, on May 24, 2005] ProQuest Doc. ID: 54811626, Jorgensen, M2 Presswire, Coventry: Jun. 5, 2000, 3 pages.
Festa, Paul (2000) "Start-up gains Netscape funding, Microsoft engineers,"CNET News.com, dated Sep. 10, 2000 downloaded from CNET.com website at http://news.com.com/2100-1017-245521.html; Retrieved from internet on Apr. 1, 2002, 2 pages.
GlueCode: Our Mission and Vision (2002) downloaded from Gluecode.com website at URL:http://www.gluecode.com/company/mission_vision.html, P.1 Retrieved from internet on Apr. 1, 2002, 1 page.
Gluecode™ (2000), Company overview and product guide downloaded from Glucode.com website at http://www.glucode.com; Retrieved from internet on Sep. 22, 2000, 18 pages.
Grand, Mark (1993) MIME Overview, downloaded from Mindspring.com website at http://www.mindspring.com/~mgrand/mime.html; Revised Oct. 26, 1993; Retrieved from internet on Mar. 1, 2001, 13 pages.
Greef, Arthur (1998) "Partner Interface Process Technical Architecture," RosettaNet/PIP Technical Architecture.doc dated Apr. 1, 2002, pp. 1-12.
Greenbaum, Joshua (2000) "Next Generation E-Business Trading Networks: Intelligent Hubs and Viquity's Nexus Solution," Enterprise Applications Consulting, Berkeley, CA (www.eaconsult.com), pp. 1-20.
IBM Technical Disclosure Bulletin, "Method of Enabling Automated Invocation of Web Services," Issue No. 455, pp. 1-6, Mar. 2002.
ipo.com—Venture Portfolio Company Profile (2002), downloaded from ipo.com website at http://www.ipo.com/venture/_pcprofile.asp?p=IPO&pc=20323; Retrieved from internet on Apr. 1, 2002, 1 page.
LaQuey, Robert E. (1999), "SML: Simplifying XML," retrieved from Internet at www.XML.com, dated Nov. 24, 1999, pp. 1-6.

Moberg, Dale and Drummond, Rik (2005) "Mime-Based Secure Peer-to-Peer Business Data Interchange Using HTTP, Applicability Statement 2 (AS2)"; Network Working Group, Request for Comments: 4130, Category: Standards Track, Copyright, The Internet Society, Jul. 2005, 47 pages.

Newcomer, "Understanding Web Service," Addison-Wesley, Boston, pp. 1-46, 2002.

Slam Dunk Networks (2000), Company overview and product guide downloaded from Slamdunknetworks.com website at http://www.slamdunknetworks.com; Retrieved from internet on Sep. 22, 2000, 15 pages.

Slam Dunk Networks$^{SM}$: A global Infrastructure for the Guaranteed Delivery of B2B Transactions over the Internet, Copyright 2000 Slam Dunk Networks, Inc., 19 pages.

Stross, Kenner (2000) "Managed B2B Infrastructure Technical Architecture," Jul. 31, 2000, Transactplus™ business quality internet, Transact Technical Architecture, pp. 1-14.

"Trails.com Teams Up With Evite to Offer Email Trip Planning Service," retrieved from Internet at www.trails.com, *Homes*, 2000.

TransactPlus Network (2000), Company overview and product guide downloaded from TransactPlus.com website at http://www.transactplus.com; Retrieved from internet on Sep. 22, 2000, 13 pages.

Viquity Dynamic Commerce Network™ (DCN) (2000), Company Overview and Service Description downloaded from Viquity.com website at http://www.viquity.com/solutions/architecture.html; Retrieved from internet on Sep. 22, 2000, 2 pages.

Viquity Press Release (2000) "Viquity Demonstrates Power of Hub Technology in ebXML Proof-of-Concept," dated Dec. 12, 2000, downloaded from Viquity.com website at http://www.viquity.com/news_events/pr_detail.asp; Retrieved from internet on Apr. 1, 2002, 2 pages.

US Office Action dated Oct. 27, 2011 issued in U.S. Appl. No. 11/773,931.

US Office Action dated May 2, 2011 issued in U.S. Appl. No. 10/742,513.

US Office Action Final dated Feb. 23, 2012 issued in U.S. Appl. No. 10/742,513.

Harding et al., (Sep. 2002) "MIME-based Secure Peer-to-Peer Business Data Interchange over the Internet", *Network Working Group*, RFC:3335, Category: Standards Track, pp. 1-28.

Nichol et al., (Sep. 2002) "Re:Convert DIME to SoW/MIME", Retrieved from the Internet: http://www.mail-arvhive.com/soap-user@xml.apache.org/msg05811.html, [retrieved on Apr. 18, 2011], 3 pages.

Barton et al., (Dec. 2000) "SOAP Messages with Attachments, W3C Note, Dec. 11, 2000", Retrieved from the Internet: http://www.w3.org/TR/SOAP-attachments, [retrieved on Apr. 18, 2011], 9 pages.

SYNCHRONOUS INTERFACE TO ASYNCHRONOUS PROCESSES

CROSS-REFERENCE TO RELATED APPLICATIONS

The present application is a continuation of and claims priority under 35 U.S.C. §120 to U.S. patent application Ser. No. 10/808,212 for SYNCHRONOUS INTERFACE TO ASYNCHRONOUS PROCESSES filed Mar. 23, 2004, the entire disclosure of which is incorporated herein by reference for all purposes. The present application is also related to U.S. patent application Ser. No. 10/727,089 for APPARATUS AND METHODS FOR PROVISIONING SERVICES filed Dec. 2, 2003(now issued as U.S. Pat. No. 7,305,454), U.S. patent application Ser. No. 10/728,356 for APPARATUS AND METHODS FOR CORRELATING MESSAGES SENT BETWEEN SERVICES filed Dec. 3, 2003 (now issued as U.S. Pat. No. 7,249,195), and U.S. patent application Ser. No. 10/742,513 for APPARATUS AND METHODS FOR MEDIATING MESSAGES filed Dec. 19, 2003, the entire disclosures of all of which are incorporated herein by reference for all purposes.

BACKGROUND

The present invention relates to techniques for enabling communication between synchronous and asynchronous processes. More specifically, the present invention enables interaction between synchronous and asynchronous web services in a network environment.

The web service provider market is one of the fastest growing segments of the software industry. Web service providers make enterprise applications, such as human resources administration, recruiting, travel and expense management, sales force automation, and so on, available to customers over the web on a subscription basis, or for free. These enterprise applications are fully managed and hosted by the web service providers, which results in significant cost savings for enterprises using the web services and eliminates many of the issues requiring individual enterprise application integration (EAI) solutions.

Some web service providers merely host and manage third-party packaged software for their customers (i.e., "managed hosters"). Others build new applications from the ground up to take advantage of the benefits and cost-savings of the web service provider model. Web service providers enjoy the profit margins and operational scalability of consumer Web companies like eBay and Yahoo, while at the same time offering the feature sets of complex enterprise software applications such as PeopleSoft and Siebel.

Client applications can locate the web services using a UDDI (Universal Description, Discovery, and Integration) service, which is based on XML (eXtended Markup Language) and SOAP (Single Object Access Protocol). XML is a markup language for documents containing structured information, that is, the information and an indication of its role, and is a common way to provide information over wide area networks, such as the Internet. SOAP is an XML-based protocol for exchanging information in a decentralized, distributed environment. SOAP can be used in combination with a variety of protocols, but its most frequent use is in conjunction with HTTP (Hyper Text Transfer Protocol). Web service providers can register contact addresses and descriptions of the provided web services in a UDDI directory, and prospective clients can use the UDDI directory as a "phone book for web services," and look up web services that fit the clients' needs.

Web services are typically described in a Web Service Description Language (WSDL), which is an XML-based format. WSDL enables separation of the description of the abstract functionality offered by a web service from concrete details of a service description, such as "where" and "how" the functionality is offered. WSDL describes web services starting with the messages that are exchanged between the web service provider and a requestor. The messages are first described abstractly and are then bound to a concrete network protocol and message format. A message consists of a collection of typed data items. A message exchange between the web service provider and the requestor is referred to as an operation. A collection of operations is a portType. Collections of portTypes are grouped and referred to as a service. A web service represents an implementation of a service and contains a collection of ports, where each port is an implementation of a portType, which includes all the concrete details the requestor needs in order to interact with the web service.

Two main communication models exist for communication between a requestor and a web service: a synchronous communication model and an asynchronous communication model. In the synchronous communication model, a requestor communicates synchronously with a synchronous web service, that is, the requestor sends a request to the web service and waits until a response is returned. The requestor is prevented from performing any other operations until the response is received.

In the asynchronous communication model, on the other hand, a requestor communicates asynchronously with a web service, that is, the requestor sends a request to the web service, some time may pass, and a response is returned by the web service. The requestor may perform other operations while waiting for the response from the web service. Currently, the two communication models cannot work in conjunction, and as a consequence there is no way for a synchronous requestor to communicate directly with an asynchronous web service, or for an asynchronous requestor to communicate directly with a synchronous web service.

SUMMARY

In general, in one aspect, the invention provides methods and apparatus, including computer program products, implementing and using techniques for enabling communication between synchronous and asynchronous processes. One or more web services are selectively accessed from a client machine over a network. A request for information is received from a client machine with a conversion engine. The request is received over a synchronous interface. The request is processed in the conversion engine, and the processed request is transmitted over an asynchronous interface from the conversion engine to at least one web service.

Advantageous implementations can include one or more of the following features. The network can be a local area network or a wide area network. A response to the processed request can be received from the at least one web service with the conversion engine over the asynchronous interface, be processed in the conversion engine, and be transmitted over the synchronous interface from the conversion engine to the client machine. Receiving a request can include blocking the client machine until a response to the received request has been obtained from the web service and delivered to the client machine, until an error message has been delivered to the client machine, or until a predetermined time period has passed. Processing the request can include receiving the request at a synchronous post interface, placing the request in a receive queue, routing the request to one or more delivery queues, and transferring the request from the delivery queues to one or more asynchronous push interfaces.

A confirmation can be received from the at least one web service over the asynchronous interface that the processed request has been received by the at least one web service. Transmitting the processed request can include pushing the processed request to the at least one web service over the asynchronous interface, or transmitting an available processed request to the at least one web service through the asynchronous interface in response to polling of the asynchronous interface by the at least one web service. Processing the request can include performing security management including authentication, authorization, security policy enforcement, decryption, or validation of digital signatures. Processing the response can include receiving the response at an asynchronous post interface, placing the response in a receive queue, and routing the response to a delivery queue for the client machine.

A confirmation can be transmitted to the at least one web service over the asynchronous interface that the response has been received by the conversion engine. Transmitting the processed response can include pushing the processed response to the client machine over the synchronous interface.

In general, in one aspect, the invention provides a conversion engine. The conversion engine has a synchronous interface, an asynchronous interface, and a processing module. The synchronous receives a request from a client machine communicating synchronously with the conversion engine over a network and delivers a response to the request from the conversion engine to the client machine over the wide area network. The asynchronous interface delivers the received request from the conversion engine to one or more web services communicating asynchronously over the wide area network, and receives a response to the request from the one or more web services over the wide area network. The processing module converts a synchronous request into an asynchronous request, and converts an asynchronous response into a synchronous response.

Advantageous implementations can include one or more of the following features. The conversion engine can include a routing module that routes a received request to one or more web services, and routes a received response to the request to the client machine. The conversion engine can include a policy directory storing policies for performing security management including one or more of: authentication, authorization, security policy enforcement, decryption, and validation of digital signatures. The conversion engine can include a web service directory containing information about available web services and their communication interfaces, for example, in the form of one or more web service description language files.

In general, in one aspect, the invention provides methods and apparatus, including computer program products, implementing and using techniques for converting a first web service description language file describing synchronous operations for a web service into a second web service description language file describing asynchronous operations. A first web service description language file describing synchronous operations for a web service is provided to a conversion engine. The first web service description language file is translated in the conversion engine into a second web service description language file describing asynchronous operations. The second web service description language file is provided to the client machine for further generation of client machine code.

Advantageous implementations can include one or more of the following features. Translating can include one or more of the following operations: translating a types part of the first web service description language file into a types part of the second web service description language file, translating a message part of the first web service description language file into a message part of the second web service description language file, translating a port type part of the first web service description language file into a port type part of the second web service description language file, translating a bindings part of the first web service description language file into a bindings part of the second web service description language file, and translating a service part of the first web service description language file into a service part of the second web service description language file.

Translating a types part can include preserving any data structures defined in the first web service description language file in the second web service description language file. Translating a types part can include adding an acknowledge element in the asynchronous web service description language file, the acknowledge element describing an acknowledgement that is returned when a request is asynchronously posted to the conversion engine by the client machine. The acknowledgement can include a correlation identifier, which can be a session identifier, a token, or a call identifier.

Translating a message part can include adding messages to the asynchronous web service description language file that are particular to asynchronous communication, including one or more of: a message for returning an acknowledgement response, a message for polling, a message for acknowledging a received request, and a message for acknowledging a response from a web service. The message for polling can include one or more of: a message for polling using a session identifier, a message for polling using a topic, and a message for polling using a token. Translating a port type part can include inserting a port type for asynchronous post operations and a port type for asynchronous poll operations into the second web service description language file. The port type can contain one or more of the following polling options: polling by session identifier, polling by topic, and polling by token.

Translating a bindings part can include inserting binding for a post port type, inserting a binding for a poll port type, and setting an encoding for messages that include the port types to reflect the encoding used by the conversion engine. Translating a service part can include adding an asynchronous post port with a first uniform resource locator addressing the conversion engine, and an asynchronous poll port with a second uniform resource locator to the conversion engine. A template stored in the conversion engine can be used for translating at least part of the synchronous web service description language file into the asynchronous web service description language file.

In general, in one aspect, the invention provides methods and apparatus, including computer program products, implementing and using techniques for converting a first web service description language file describing asynchronous operations for a web service into a second web service description language file describing synchronous operations. A first web service description language file describing asynchronous operations for a web service is provided to a conversion engine. The first web service description language file is translated in the conversion engine into a second web service description language file describing synchronous operations. The second web service description language file is provided to the client machine for further generation of client machine code. The invention can be implemented to include one or more of the following advantages. Requestors and web services can communicate with each other regardless of which communication model they support. For example, a synchronous requestor can communicate directly with an asynchronous web service. Similarly, an asynchronous requestor can communicate directly with a synchronous web service. This enables requestors to access a wider range of web services, hosting services both specific to the requestors' respective enterprises, as well as common application services, such as doing a customer credit check, neither of which the requestors need to create nor maintain.

The ability to communicate with web services, irrespective of their respective communication models, facilitates information and services exchange between enterprises. For example, two enterprises can access the same web service network, where they have access to common information and services. This, in turn, facilitates inter-enterprise processes such as assuring that there are enough raw materials available to build a certain product. More enterprise application functions can be hosted by web services and accessed on a subscription basis, instead of within the requestor's own enterprise, which may lead to significant cost savings. WSDL files describing synchronous web services can be converted into asynchronous WSDL files that can be used by asynchronous requestors to communicate with the synchronous web services, without the requestors having to know that they are communicating with synchronous web services. Use of asynchronous services may ease implementation of parallel data processing.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The invention will now be described by way of example with reference to specific implementations that are illustrated in the accompanying drawings. While the invention is described in conjunction with these specific implementations, it will be understood that this description is not intended to limit the invention to the described implementations. On the contrary, this detailed description is intended to cover alternatives, modifications, and equivalents as may be included within the spirit and scope of the invention as defined by the appended claims.

Figure 1:
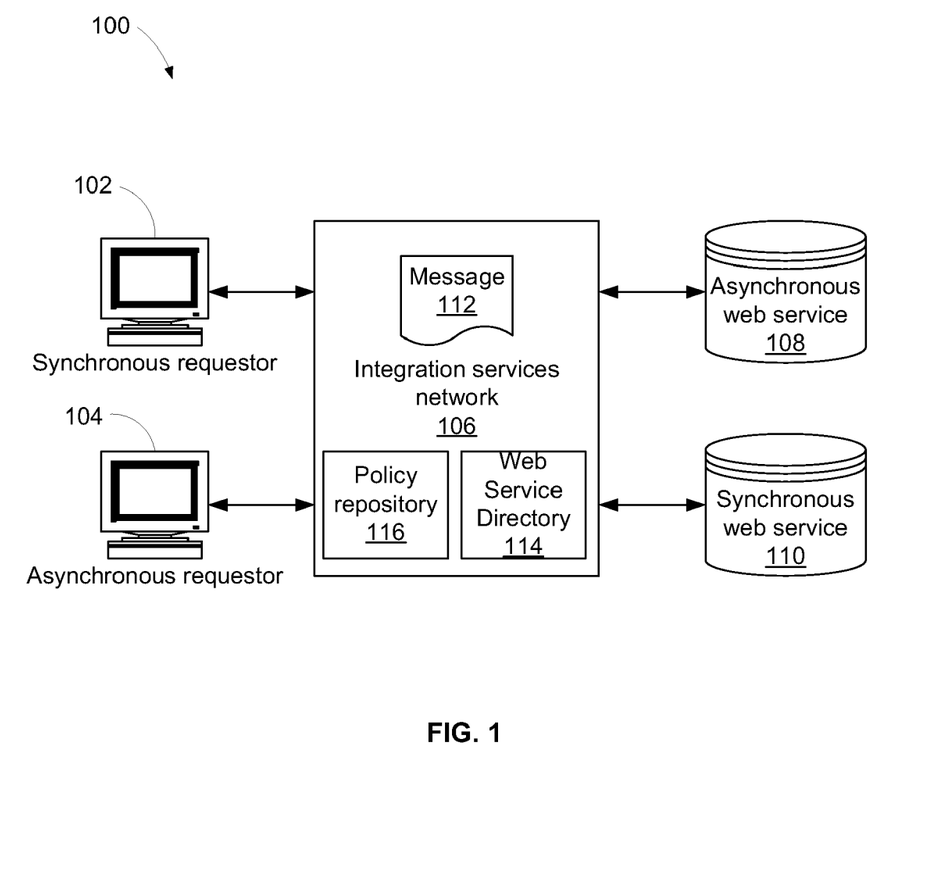
FIG. 1 shows a schematic diagram of a system in which the invention can be implemented.

FIG. 1 shows a schematic diagram of a system (100), in which the invention can be implemented. As can be seen in FIG. 1, the system (100) includes a requestor (102), or client, that uses a synchronous communication model to access web services, and a requestor (104), or client, that uses an asynchronous communication model to access web services. The system further includes a web service (108) that is configured to be accessed asynchronously, and a web service (110) that is configured to be accessed synchronously. It should be noted that only two requestors and two web services are shown for simplicity. In a typical situation, typically, many web services and many requestors are present.

The system (100) further includes an integration services network (106), for enabling the requestors (102; 104) to communicate with the web services (108; 110) irrespective of the communication methods supported by the individual requestors and web services. The integration services network (106) is accessible for the requestors (102; 104) and the web services (108; 110) over a local area network, such as an intranet, or over a wide area network, such as the Internet. The integration services network (106) facilitates interoperability using a wide variety of web services technologies and standards including, for example, SOAP, WSDL, WS-Security, WS-Policy, and Business Process Execution Language (BPEL), and mediates the technology differences in data formats, communications protocols and business policies through a set of established and defined policies. The system (100) can be either an "open system" or a "closed system." In an open system, typically, the requestors (102; 104) and web services (108; 110) are owned and/or managed by entities distinct from each other and distinct form the owner of the integration services network (106). In the closed system, the requestors (102; 104) and web services (108; 110) are typically owned and/or managed by the owner of the integration services network (106). Combinations of open and closed system are also possible, in which there are some commonly owned and/or managed components, and some components that are owned and/or managed by different entities.

As can be seen in FIG. 1, the integration services network (106) contains a message (112) that is sent from a requestor (102; 104) to a web service (108; 110) through the integration services network (106). The message can, for example, be a request for information that is sent by a specific requestor (102) to a specific web service (108) that is hosted at a remote location.

In some implementations, the integration services network (106) can also specify which requestors (102; 104) have permission to access the web services (108; 110). For example, the integration services network (106) can provide security management including authentication, authorization and security policy enforcement at various points in a message's (112) lifecycle inside the integration services network (106), for example, when a message (112) is sent into the integration services network (106) from a requestor (102; 104), and when the message (112) is routed to its destination web service (108; 110). In one implementation, the policies needed for the integration services network (106) to perform security management operations are stored securely in a policy repository (116) in the integration services network (106). According to various implementations, the requestors (102; 104) and the providers of the web services (108; 110) need not be aware of the message format requirements of the party to which the message (112) is sent, nor of any message format translation taking place in the integration services network (106). A more detailed discussion of exemplary processes for mediating messages between the synchronous and asynchronous communication formats is provided below with reference to FIGS. 2 and 3.

In addition to providing mechanisms for mediating messages (112) sent between requestors (102; 104) and web services (108; 110), the integration services network (106)

also preferably includes a web service directory (114) for storing various information regarding the web services (108; 110) that are accessible through the integration services network (106). Such information may include, for example, information similar to the UDDI information, which facilitates locating web services (108; 110) for requestors (102; 104), WSDL files for the different web services (108; 110), and policies that control which requestors (102; 104) and web services (108; 110) may interact, and how the interaction occurs. The integration services network (106) preferably also includes mechanisms for creating and combining web services (108; 110), registering requestors (102; 104) and their identifying information, and handling messages (112) routed between web services (108; 110) and/or requestors (102; 104). The directory (114) may be created from one or more databases stored on one or more memory devices on one or more computing platforms. Implementations of the integration services network (106) can also include components enabling complex routing and business process management, which both have been described in the above-referenced patent applications.

FIG. 1 has been described with reference to web services. However, it should be clear that the concepts described above can be applied to any type of "service," such as any computer application, process, entity, or device accessible to other applications, processes, entities, or devices through an interface such as an application programming interface (API), user interface, or Internet web user interface by any of a variety of protocols over a network within an entity or over the Internet. A service can also include multiple methods or applications on a single device or distributed across multiple devices.

Additional mechanisms and techniques for provisioning services and for enabling disparate entities to interact according to the invention are described in U.S. patent application Ser. Nos. 09/820,964, 09/820,966, 10/727,089, 10/728,356 and 10/742,513 incorporated herein by reference above. Any of the mechanisms described in these referenced applications can easily be applied with the techniques described herein.

Figure 2:
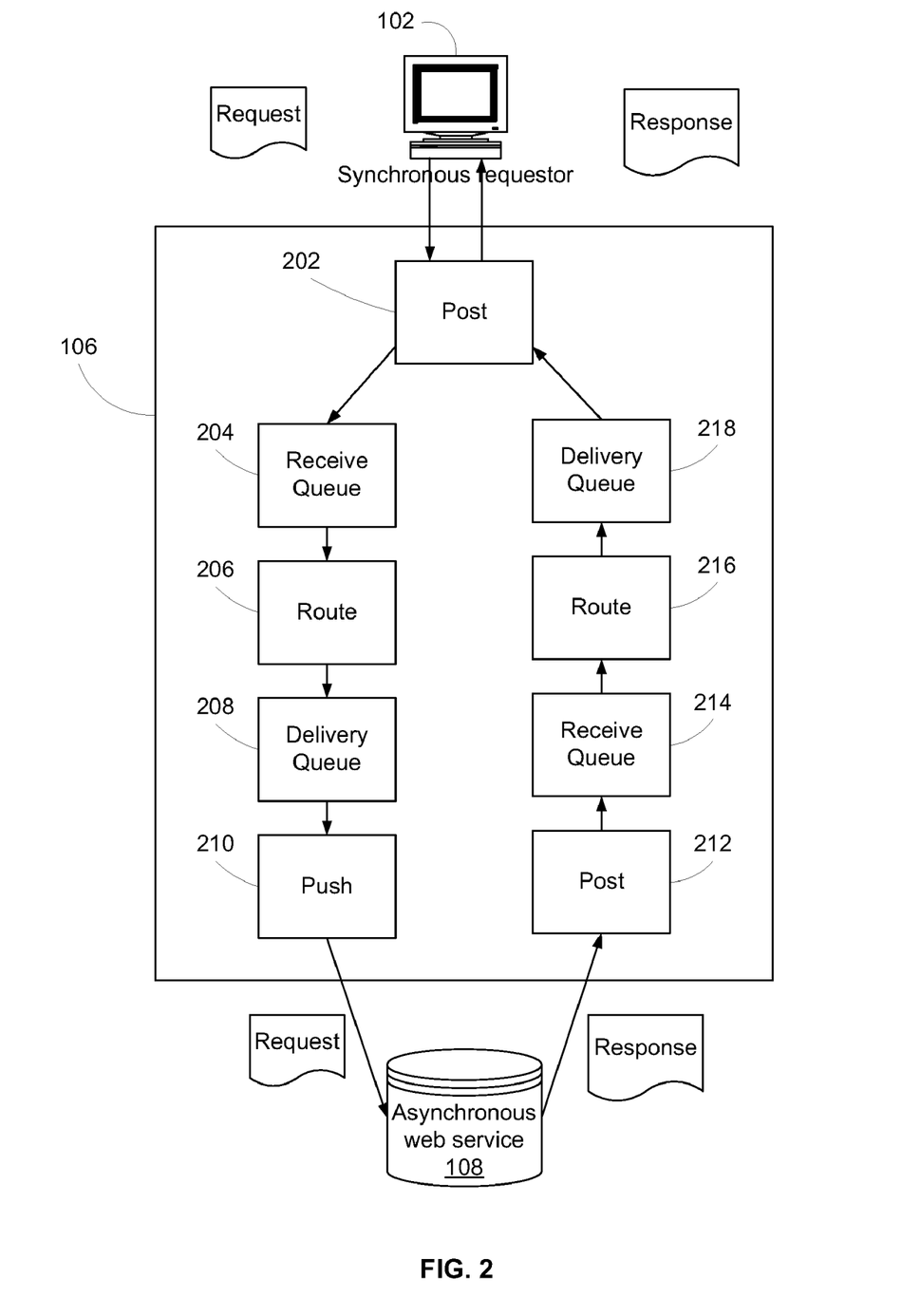
FIG. 2 shows a schematic diagram of how a synchronous requestor communicates through an integration services network with an asynchronous web service.

Two exemplary scenarios will now be described with reference to FIGS. 2 and 3. In the first scenario, which is illustrated in FIG. 2, an implementation is shown in which a requestor (102) that supports only synchronous communication sends a request to the integration services network (106), which forwards the request to and receives a response from a web service (108) that supports only asynchronous communication. In the second scenario, which is described in FIG. 3, an implementation is shown in which a requestor (104) that supports only asynchronous communication sends a request to the integration services network (106), which forwards the request to and receives a response from a web service (110) that supports only synchronous communication. The scenarios in which a synchronous requestor (102) communicates with a synchronous web service (108), and in which an asynchronous requestor (104) communicates with an asynchronous web service (110), are well described in the art as well as in the above-referenced patent applications, and will therefore not be discussed herein. In one implementation, the operations that will be described below are performed by a conversion engine, which forms part of the integration services network (106) and is dedicated to performing operations for connecting synchronous requestors with asynchronous web services, and asynchronous requestors with synchronous web services, respectively.

As can be seen in FIG. 2, a request to obtain information from an asynchronous web service (108) is sent by a synchronous requestor (102). The request is posted to a synchronous post interface (202) in the integration services network (106). The synchronous post interface (202) can, for example, be a SOAP over HTTP interface, or a HTTP Get interface. It should be noted that such an interface can also be used for the integration services network's (106) asynchronous interfaces. The difference, as will be seen below, is that for a synchronous interface, the requestor (102) and integration services network (106) agree that the requestor (102) will block until the integration services network (106) synchronously returns a response. For an asynchronous interface, on the other hand, the requestor (102) and the integration services network (106) agree that the integration services network (106) will only synchronously return an acknowledgement, and then the integration services network (106) will later make a response available asynchronously. The format of the posted request is identical to a request that would otherwise be posted directly to a synchronous web service. The synchronous post interface (202) blocks the request and places the request in a receive queue (204). In one implementation the posting of the request establishes an HTTP session between the synchronous requestor (102) and the integration services network (106). The synchronous requestor now waits until a response is delivered back from the integration services network (106). The request is then retrieved from the receive queue (204) and routed (206) to one or more delivery queues (208). Typically there is one delivery queue (208) for each web service (108) to which the request should be sent. For simplicity, only one delivery queue (208) is shown in FIG. 2. In one implementation, the routing is performed by a message router in the integration services network (106), and the message router also performs a security policy and permission verification to verify that the requestor (102) is allowed to send requests to the web service (108) in question, and that the request has the proper format. In some implementations, complex routing, for example, rule-based routing, as described in the above-referenced patent applications, can be used. The integration services network (106) then retrieves the request from the delivery queue and pushes (210) the request out to the web service (108) that is associated with the delivery queue. The push delivery of the request is similar to what would have occurred had the requestor (102) been an asynchronous client and invoked the web service (108) directly. The asynchronous web service (108) receives, acknowledges, and processes the request. It should be noted that in one implementation the asynchronous web service (108) does not return a response synchronously to the received request, since this would be interpreted only as a delivery acknowledgement and not a response. Any responses from the asynchronous web service (108) are instead posted separately to the integration services network (106), as will be seen below.

When the asynchronous web service (108) is done processing the request and has generated a response, the response is posted asynchronously to a post interface (212) in the integration services network (106). As was discussed above, this post interface (212) can, for example, be a SOAP over HTTP interface, or a HTTP Get interface. Just like when a request is sent, the format of the posted response is identical to a response that would otherwise be posted directly to an asynchronous requestor, so the asynchronous web service (108) does not have to be aware of that the requestor (102) is asking for a synchronous response. The response can either be posted to the network by the web service, which is also referred to as pushing the request, or the integration services network (106) can poll the asynchronous web service (108) for a response. If the posting was successful, the post interface (212) returns a confirmation to the web service (108), and places the request in a receive queue (214). If the posting is unsuccessful, the post interface (212) returns an error, and the web service (108) attempts to post the response again at a later time. After successful posting and delivery to the receive queue (214), the response is retrieved from the receive queue (214) and routed (216) to a delivery queue (218) for the synchronous requestor (102). The post interface (202) continuously polls the delivery queue (218) to determine whether any responses have been posted to the delivery queue (218). When a response is detected in the delivery queue (218), the response is returned to the synchronous requestor (102) and the process ends.

From the synchronous requestor's (102) side, it appears as if the asynchronous web service (108) is a synchronous web service, since the synchronous requestor is not aware of any operations that occur within the integration services network (106). All the synchronous requestor (102) sees is a request being sent out, blocked, and a response returned after some time has passed. It should be noted that other implementations are also possible. For example, the asynchronous web service (108) could use a polling interface instead of the push interface (210) to accept requests.

Figure 3:
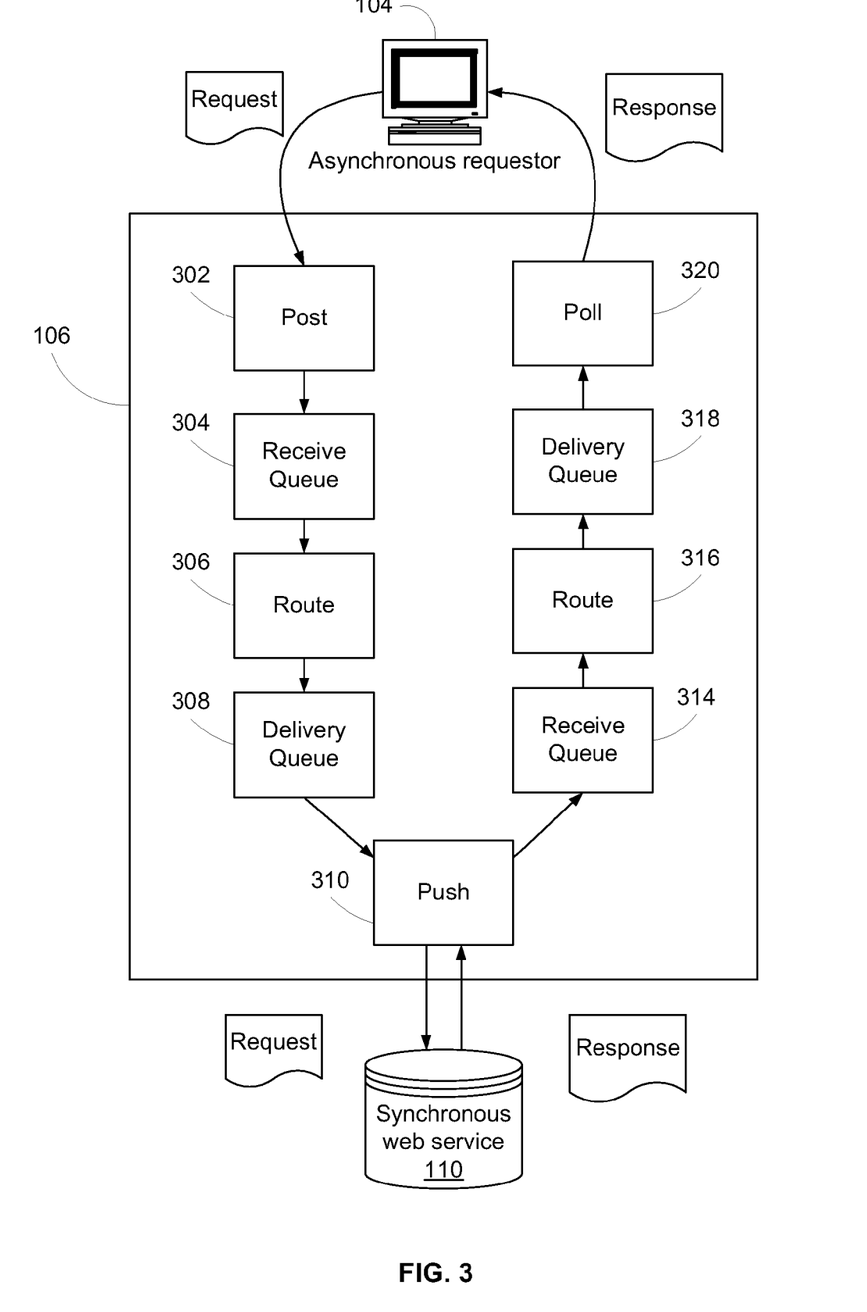
FIG. 3 shows a schematic diagram of how an asynchronous requestor communicates through an integration services network with a synchronous web service.

Turning now to the second scenario, which is described in FIG. 3, an implementation is shown in which a requestor (104) that supports only asynchronous communication sends a request to the integration services network (106), which forwards the request to and receives a response from a web service (110) that supports only synchronous communication. As can be seen in FIG. 3, a request to obtain information from a synchronous web service (110) is sent by an asynchronous requestor (104). The request is posted to an asynchronous post interface (302) in the integration services network (106), such as a SOAP over HTTP interface, or a HTTP Get interface. The format of the posted request is identical to a request that would otherwise be posted directly to an asynchronous web service. If the posting was successful, the asynchronous post interface (302) returns a confirmation to the asynchronous requestor (104), and places the request in a receive queue (304). If the posting is unsuccessful, the asynchronous post interface (302) returns an error, and the requestor (104) attempts to post the request again at a later time. After successful posting and delivery to the receive queue (304), the request is retrieved from the receive queue (304) and routed (306) to one or more delivery queues (308). Again, typically there is one delivery queue (308) for each web service (108) to which the request should be sent, but for simplicity, only one delivery queue (308) is shown in FIG. 3. Also here, the routing can be performed by a message router in the integration services network (106), which may also perform a security policy and permission verification to verify that the requestor (104) is allowed to send requests to the web service (110), and ensure that the request has the proper format. The integration services network (106) then retrieves the request from the delivery queue and pushes (310) the request out to the web service (110) that is associated with the delivery queue (308). The push delivery of the request is much like as if the requestor (104) had invoked the web service (110) directly. The pushing of the request establishes an HTTP session between the synchronous web service (110) and the integration services network (106).

When the synchronous web service (110) is done processing the request and has generated a response, the response is synchronously returned to the push interface (312), for example, a SOAP over HTTP interface, or a HTTP Get interface, in the integration services network (106) on the same HTTP session that the request was delivered on, and the HTTP session between the integration services network (106) and the synchronous web service (110) is terminated. Just like when a request is sent, the format of the response is identical to a response that would otherwise be returned directly to a synchronous requestor, so the synchronous web service (110) does not have to be aware of that the requestor (104) requires an asynchronous response. The returned response is delivered to a receive queue (314) and routed (316) to a delivery queue (318) for the asynchronous requestor (104).

The asynchronous requestor continuously polls (320) the delivery queue (318) to determine whether any responses have been posted to the delivery queue (318). When a response is detected in the delivery queue (318) through the polling operation (320), the response is returned to the asynchronous requestor (104), which acknowledges the returned response, and ends the process. From the asynchronous requestor's (104) side, it appears as if the synchronous web service (110) is an asynchronous web service. It should be noted that other implementations are also possible. For example, a push interface could be used instead of the poll interface (320) to supply responses to the requests to the asynchronous requestor (104).

As was described above, WSDL is an XML-based description of how to connect to and communicate with a particular web service. A WSDL description abstracts a particular service's various connection and messaging protocols into a neutral interface description and forms a key element of the UDDI directory's service discovery model. A WSDL file typically has five different parts: a types part, a message part, a port type part, a bindings part, and a service part. The types part is used to define data structures, the messages part is used to define one or more messages, the port type part is used to define how messages will be grouped together into operations, the bindings part is used to define encoding and placement of message parts, and the service part is a collection of ports consisting of a binding and a network address (or URL) for the web service. Many synchronous web services use WSDL to describe the web service. When a synchronous requestor would like to synchronously invoke a synchronous web service, the requestor can obtain the WSDL file describing the synchronous web service, bring the WSDL file into their computer system, which parses the WSDL file and generates code on the requestor's computer system that can properly invoke the synchronous web service. However, as was seen in FIG. 3, many requestors communicate asynchronously and can therefore not benefit from the WSDL files that are designed for synchronous communication.

The invention solves this problem by translating a WSDL file published by a synchronous web service (110) with the integration services network (106) into a WSDL file that can be used by an asynchronous requestor. In one implementation, the translation of the WSDL file for a synchronous web service (110) occurs when the synchronous web service (110) registers in the directory (114) of the integration services network (106), or "on the fly," that is, the original WSDL file is stored in the integration services network (106) until a user indicates interest in using the synchronous web service (110), at which time a translated WSDL file is generated and distributed to the user. When a requestor indicates interest in using the synchronous web service (110), the integration services network (106) asks the requestor whether the requestor would like to use the web service (110) synchronously or asynchronously. If the requestor selects asynchronous use, the translated WSDL file is supplied to the requestor, where the translated WSDL file is used to generate the necessary client code. Otherwise, the original WSDL file published by the web service (110) is provided to the requestor. In one implementation, the original WSDL file may be modified such that the synchronous web service (110) is invoked through the integration services network (106), for example, by modifying the synchronous web service's URL in the WSDL to point to the address of the integration services network (106). Table 1 below shows an exemplary synchronous WSDL file, and Table 2 shows a corresponding translated WSDL file for asynchronous consumption, for an exemplary web service "WeatherService" that provides weather information. Line numbers have been added on the left hand side of Tables 1 and 2 in order to facilitate the explanation below, and do not form part of the original WSDL file or the translated WSDL file.

TABLE 1

```
1)  <?xml version="1.0"?>
2)  <definitions name="WeatherService"
3)       targetNamespace="http://www.example.com/weather"
4)       xmlns:tns="http://www.example.com/weather"
5)       xmlns:xsd="http://www.w3.org/2001/XMLSchema"
6)       xmlns:soap="http://schemas.xmlsoap.org/wsdl/soap/"
7)       xmlns="http://schemas.xmlsoap.org/wsdl/">
8)       <types>
9)           <schema
10)              xmlns="http://www.w3.org/2001/XMLSchema"
11)          targetNamespace="http://www.example.com/weather">
12)              <complexType name="weatherReport">
13)                  <sequence>
14)                      <element name="time" type="xsd:dateTime"/>
15)                      <element name="temperature" type="xsd:int"/>
16)                      <element name="humidity" type="xsd:int"/>
17)                      <element name="wind" type="xsd:string"/>
18)                  </sequence>
19)              </complexType>
20)          </schema>
21)      </types>
22)      <message name="getWeatherRequest">
23)          <part name="zipcode" type="xsd:string"/>
24)      </message>
25)      <message name="getWeatherResponse">
26)          <part name="return" type="tns:weatherReport"/>
27)      </message>
28)      <portType name="publicWeatherPort">
29)          <operation name="getWeather">
30)              <input message="tns:getWeatherRequest"/>
31)              <output message="tns:getWeatherResponse"/>
32)          </operation>
33)      </portType>
34)      <binding name="weatherSOAPBinding" type="tns:publicWeatherPort">
35)          <soap:binding style="rpc" transport="http://schemas.xmlsoap.org/soap/http"/>
36)          <operation name="getWeather">
37)              <soap:operation soapAction=""/>
38)              <input>
39)                  <soap:body use="encoded" namespace=http://www.example.com/weather encodingStyle="http://schemas.xmlsoap.org/soap/encoding/"/>
40)              </input>
41)              <output>
```

TABLE 1-continued

```
42)                  <soap:body use="encoded" namespace=http://www.example.com/weather encodingStyle="http://schemas.xmlsoap.org/soap/encoding/"/>
43)              </output>
44)          </operation>
45)      </binding>
46)      <service name="WeatherService">
47)          <port name="weatherSOAPPort" binding="tns:weatherSOAPBinding">
48)              <soap:address location="http://services.example.com/soap/weather"/>
49)          </port>
50)      </service>
51) </definitions>
```

As can be seen in Table 1, the original WSDL file contains a types part (lines 8-21), a message part (lines 22-27), a port type part (lines 28-33), a bindings part (lines 34-45), and a service part (lines 46-50).

The type part of the WSDL file defines a data structure called "WeatherReport" (line 12). The WeatherReport data structure contains four data elements: time, temperature, humidity, and wind (lines 13-18).

The message part of the WSDL file defines messages that will be sent to and from the web service. The first message is a request message, getWeatherRequest (line 22), which has one part containing a string zip code (line 23). The second message is a response message, getWeatherResponse (line 25) that will be sent back and has one part called "return" (line 26) of the type WeatherReport. Thus, the response will contain the four elements defined above in the WeatherReport data structure.

The port type part of the WSDL file defines how the messages will be grouped together. In this example, an operation, getWeather (line 29) consists of an input message getWeatherRequest (line 30) and an output message getWeatherResponse (line 31), which were both described above. In a real world scenario, there would typically be many different operations, each of which has one input message and one output message. However, it should be noted that the WSDL format also fully allows operations that have only an input message but no output message and vice versa.

The bindings part of the WSDL file defines the protocol binding for the port, i.e., the publicWeatherPort (line 34). In this example, the binding is a SOAP RPC style (line 35), which occurs over HTTP (line 35). No SOAP action is needed (line 37). The input and output use SOAP encoded style (lines 39 and 42), as required by RPC interactions.

Finally, the services part of the WSDL file defines how the web service is exposed to the outside world in terms of addressing. In this example, there is one port, weatherSOAPPort (line 47) with the address http://services.example.com/soap/weather (line 48).

When the synchronous WSDL file in Table 1 is translated into an asynchronous format, the resulting file is the WSDL file shown in Table 2 below. It should be noted that the translated WSDL file in Table 2 is simply an example. Other similar formats and content are also possible.

TABLE 2

```
1)  <?xml version="1.0" encoding="UTF-8"?>
2)  <definitions
3)       targetNamespace="http://www.example.com/weather"
4)       xmlns:gcPoll="http://grandcentral.com/schemas/poll/v1"
5)       xmlns:soap="http://schemas.xmlsoap.org/wsdl/soap/"
6)       xmlns:enc="http://schemas.xmlsoap.org/soap/encoding/"
7)       xmlns:tns="http://www.example.com/weather"
8)       xmlns:xsd="http://www.w3.org/2001/XMLSchema"
9)       xmlns:gcPmark="http://grandcentral.com/schemas/postmark/v1"
10)      xmlns="http://schemas.xmlsoap.org/wsdl/">
```

TABLE 2-continued

```
11)     <types>
12)         <schema
13)         targetNamespace="http://www.example.com/weather"
14)             xmlns="http://www.w3.org/2001/XMLSchema">
15)             <complexType name="weatherReport">
16)                 <sequence>
17)                     <element name="time" type="xsd:dateTime"/>
18)                     <element name="temperature" type="xsd:int"/>
19)                     <element name="humidity" type="xsd:int"/>
20)                     <element name="wind" type="xsd:string"/>
21)                 </sequence>
22)             </complexType>
23)         </schema>
24)         <xsd:schema
25)             xmlns:xsd="http://www.w3.org/2001/XMLSchema"
26)             targetNamespace="http://grandcentral.com/schemas/postmark/v1">
27)             <xsd:complexType name="postmarkType">
28)                 <xsd:sequence>
29)                     <xsd:element minOccurs="0" name="session" nillable="true" type="xsd:string"/>
30)                     <xsd:element minOccurs="0" name="token" nillable="true" type="xsd:string"/>
31)                     <xsd:element minOccurs="0" name="call" nillable="true" type="xsd:string"/>
32)                 </xsd:sequence>
33)             </xsd:complexType>
34)         </xsd:schema>
35)     </types>
36)     <message name="getWeatherRequest">
37)         <part name="zipcode" type="xsd:string"/>
38)     </message>
39)     <message name="postmarkResponse">
40)         <part name="postmark" type="gcPmark:postmarkType"/>
41)     </message>
42)     <message name="getMessageBySession">
43)         <part name="session" type="xsd:string"/>
44)     </message>
45)     <message name="getMessageByTopic">
46)         <part name="topic" type="xsd:string"/>
47)     </message>
48)     <message name="getMessageByToken">
49)         <part name="token" type="xsd:string"/>
50)     </message>
51)     <message name="getWeatherResponse">
52)         <part name="return" type="tns:weatherReport"/>
53)     </message>
54)     <message name="acknowlegeRequest">
55)         <part name="token" type="xsd:string"/>
56)     </message>
57)     <message name="acknowlegeResponse">
58)     </message>
59)     <portType name="postpublicWeatherPort">
60)         <operation name="getWeather">
61)             <input message="tns:getWeatherRequest"/>
62)             <output message="tns:postmarkResponse"/>
63)         </operation>
64)     </portType>
65)     <portType name="pollpublicWeatherPort">
66)         <operation name="pollGetWeatherBySession">
67)             <input message="tns:getMessageBySession"/>
68)             <output message="tns:getWeatherResponse"/>
69)         </operation>
70)         <operation name="pollGetWeatherByTopic">
71)             <input message="tns:getMessageByTopic"/>
72)             <output message="tns:getWeatherResponse"/>
73)         </operation>
74)         <operation name="pollGetWeatherByToken">
75)             <input message="tns:getMessageByToken"/>
76)             <output message="tns:getWeatherResponse"/>
77)         </operation>
78)         <operation name="acknowledge">
79)             <input message="tns:acknowlegeRequest"/>
80)             <output message="tns:acknowlegeResponse"/>
81)         </operation>
82)     </portType>
```

TABLE 2-continued

```
83)       <binding name="PostWeatherSOAPBinding"
   type="tns:postpublicWeatherPort">
84)           <soap:binding style="rpc"
   transport="http://schemas.xmlsoap.org/soap/http"/>
85)           <operation name="getWeather">
86)               <soap:operation soapAction=""/>
87)               <input>
88)                   <soap:body use="encoded"
   encodingStyle="http://schemas.xmlsoap.org/soap/encoding/"
   namespace="http://www.example.com/weather"/>
89)               </input>
90)               <output>
91)                   <soap:body use="encoded"
   encodingStyle="http://schemas.xmlsoap.org/soap/encoding/"
92)           namespace="http://grandcentral.com/schemas/postmark/v1"/>
93)               </output>
94)           </operation>
95)       </binding>
96)       <binding name="PollWeatherSOAPBinding"
   type="tns:pollpublicWeatherPort">
97)           <soap:binding style="rpc"
   transport="http://schemas.xmlsoap.org/soap/http"/>
98)           <operation name="pollGetWeatherBySession">
99)               <soap:operation soapAction=""/>
100)              <input>
101)                  <soap:body use="encoded"
   encodingStyle="http://schemas.xmlsoap.org/soap/encoding/"
102)          namespace="http://www.example.com/weather"/>
103)              </input>
104)              <output>
105)                  <soap:body use="encoded"
   encodingStyle="http://schemas.xmlsoap.org/soap/encoding/"
   namespace="http://www.example.com/weather"/>
106)              </output>
107)          </operation>
108)          <operation name="pollGetWeatherByTopic">
109)              <soap:operation soapAction=""/>
110)              <input>
111)                  <soap:body use="encoded"
   encodingStyle="http://schemas.xmlsoap.org/soap/encoding/"
112)          namespace="http://www.example.com/weather"/>
113)              </input>
114)              <output>
115)                  <soap:body use="encoded"
   encodingStyle="http://schemas.xmlsoap.org/soap/encoding/"
   namespace="http://www.example.com/weather"/>
116)              </output>
117)          </operation>
118)          <operation name="pollGetWeatherByToken">
119)              <soap:operation soapAction=""/>
120)              <input>
121)                  <soap:body use="encoded"
   encodingStyle="http://schemas.xmlsoap.org/soap/encoding/"
122)          namespace="http://www.example.com/weather"/>
123)              </input>
124)              <output>
125)                  <soap:body use="encoded"
   encodingStyle="http://schemas.xmlsoap.org/soap/encoding/"
   namespace="http://www.example.com/weather"/>
126)              </output>
127)          </operation>
128)          <operation name="acknowledge">
129)              <soap:operation soapAction=""/>
130)              <input>
131)                  <soap:body use="encoded"
   encodingStyle="http://schemas.xmlsoap.org/soap/encoding/"
132)          namespace="http://grandcentral.com/schemas/poll/v1"/>
133)              </input>
134)              <output>
135)                  <soap:body use="encoded"
   encodingStyle="http://schemas.xmlsoap.org/soap/encoding/"
136)          namespace="http://grandcentral.com/schemas/poll/v1"/>
137)              </output>
138)          </operation>
139)      </binding>
140)      <service name="WeatherService">
141)          <port name="postweatherSOAPPort"
   binding="tns:PostWeatherSOAPBinding">
142)              <soap:address
   location="http://pop.grandcentral.com/post/soaprpc/example.com/weather"/>
```

TABLE 2-continued

```
143)           </port>
144)           <port name="pollweatherSOAPPort"
    binding="tns:PollWeatherSOAPBinding">
145)              <soap: address
    location="http://pop.grandcentral.com/poll/soaprpc"/>
146)           </port>
147)        </service>
148) </definitions>
```

Just like the synchronous WSDL file shown in Table 1, the translated asynchronous WSDL file contains a types part (lines 11-35), a message part (lines 36-58), a port type part (lines 59-82), a bindings part (lines 83-139), and a service part (lines 140-147).

In the types part, the WeatherReport data structure is preserved from the original WDSL file (lines 15-22). A "postmarkType" data structure has been added (lines 27-33), which describes a postmark that is returned when a request is asynchronously posted to the integration services network (106). The postmark is used during the polling described above with reference to FIG. 2 and FIG. 3, so that the integration services network (106) knows which response to look for during the polling operation. Three identifiers are provided in the postmark: a session (line 29), a token (line 30), and a call (line 31).

As can be seen, the message part in the translated WSDL file in Table 2 contains more messages than the original WSDL file. Just like in the original WSDL file, there is a getWeatherRequest message, where a zip code can be submitted (lines 36-38). The next message, postmarkResponse, is a response message containing a postmark (lines 39-41). The next message, getMessageBySession, describes a way to poll using a session identifier (lines 42-44). getMessageByTopic, describes a way to poll using a topic (lines 45-47). getMessageByToken, describes a way to poll using a token (lines 48-50). getWeatherResponse (lines 51-53) is, just like in Table 1, a message that contains the response from the web service. Finally, there are a couple of additional messages for acknowledging successful retrieval of messages from the integration services network (106) (lines 54-58).

The port type part contains a post port (lines 59-64) and a poll port (lines 65-82), since both a post port and a poll port is needed for asynchronous operation, as described above with reference to FIG. 3. The post port has an operation called getWeather (line 60), and the input is, just like in the original WSDL file, getWeatherRequest (line 61), but instead of getting the getWeatherResponse, a postmark response is given back (line 62). The poll port contains three different polling options: polling by session identifier (lines 66-69), polling by topic (lines 70-73), and polling by token (lines 74-77). As was described above, both the token for the response message and session were returned in the postmark. The topic would potentially be included in the request that was sent to the web service, similar to a subject line of a message. The token guarantees that the exact message will be obtained. A session can contain multiple messages, so polling by session will return one or more of multiple active messages related to a particular session. A topic is similar to a session in that the topic can also be present in multiple messages, and that polling by topic may return one or more messages related to the particular topic. When polling by one of these methods, the getWeatherResponse is returned, that is, the getWeatherResponse message is now returned asynchronously from the getWeatherRequest message, whereas in the original WSDL file in Table 1, the response would have been returned synchronously. The acknowledge operation (lines 78-81) is a way for the web service to tell the integration services network (106) that the message has been received and can be deleted from the delivery queue in the integration services network.

The bindings section is similar to the original WSDL file. As the reader skilled in the art will realize, there are other bindings than SOAP that could be used, for example, an HTTP Get binding, and that SOAP is only used herein by way of example for illustrative purposes. Finally, the service part has two ports: a post port, postweatherSOAPPort (line 141), and a poll port, pollweatherSOAPPort (line 144), that each has their own URL.

As the reader skilled in the art will realize, a corresponding translation can be made from a WSDL for an asynchronous web service into a WSDL for a synchronous client. However, at the present time asynchronous web services are far less common than synchronous web services, so the vast majority of WSDL conversions would occur in the manner described above. In doing such a translation, however, it is necessary to know which combinations of asynchronous operations can be combined into a single synchronous operation. Thus, the translation requires either some convention on naming of operations, in order to be performed completely automatically, or some interaction from a user indicating how asynchronous operations pair up to form a synchronous operation. Such a mapping can, for example, be accomplished with a mapping tool with which a user can select operations out of rendered WSDL information to indicate pairing into synchronous operations. The mapping can, for example, be done at the time of registering the web service with the integration services network (106).

In both cases, the directory in the integration services network can, for example, store templates for the conversions or translations that are later modified for the specific instance of a needed conversion. For example, a template can contain the parts of Table 2 above that are independent of the original WSDL file, such as the postmark data structure and all the messages that define polling and acknowledging. The template can have sections in which parts of the original WSDL are substituted into the template. Templates, however, are just one approach, and there can be other equally useful approaches as well.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of the invention have been described. Nevertheless, it will be understood that various modifications may be made without departing from the spirit and scope of the invention. For example, the operations of the integration services network can be performed either on the requestors' computer systems, or on the web service's, respectively, and similar results could be achieved. However, this would place larger requirements on the requestors and web services, respectively, which can be avoided with the approaches described above, where the requestors and web services do not need to have any information about the configuration of the respective partners with which they communicate. In this case, the integration services network (106) acts a shared service available on the public Internet to the requestors and web services. Accordingly, other embodiments are within the scope of the following claims.

What is claimed is:

1. A computer-implemented method for selectively accessing one or more web services from a client machine, the one or more web services and the client machine being accessible over a network, the method comprising:
storing, at a host, a first web service description file describing how to interact with a web service using asynchronous communications, the web service being accessible via the host;
translating, at the host, the first web service description file into a second web service description file describing how to interact with the web service using synchronous communications;
receiving, at the host, a request from the client machine to use synchronous communications between the client machine and the web service; and
providing, to the client machine, the second web service description file.

2. The computer-implemented method of claim 1, wherein providing the second web service description file to the client machine to define interaction with the web service includes providing data for generation of client machine code to interact with the at least one web service.

3. The computer-implemented method of claim 1, further comprising:
facilitating communication between the client machine and the web service via one or more conversion engines, the one or more conversion engines configured to communicate asynchronously with the first web service in accordance with the first web service description file, the one or more conversion engines configured to communicate synchronously with the first client machine in accordance with the second web service description file.

4. The integration services network of claim 3, wherein facilitating communications between the first client machine and the first web service comprises:
receiving a synchronous request from the client machine in accordance with the second description, and
converting the synchronous request to an asynchronous message for transmission to the first web service in accordance with the first description.

5. The computer-implemented method of claim 1, the method further comprising:
storing a directory in a central repository, the directory mapping an identity for each of a plurality of users to a policy framework which defines access information relating to the one or more web services.

6. The computer-implemented method of claim 5, wherein the network comprises an integration services network configured to facilitate messaging and mediate policy differences among a plurality of users and the one or more web services according to the policy framework.

7. The computer-implemented method of claim 5, wherein the central repository is configured to store one or more web service description files for one or more of the web services, the central repository storing at least the first and second web service description files.

8. The computer-implemented method of claim 1, wherein translating the first web service description file to the second web service description file includes one or more of the following operations:
translating a types part of the first web service description file into a types part of the second web service description file,
translating a message part of the first web service description file into a message part of the second web service description file,
translating a port type part of the first web service description file into a port type part of the second web service description file,
translating a bindings part of the first web service description file into a bindings part of the second web service description file, and
translating a service part of the first web service description file into a service part of the second web service description file.

9. An integration services network for providing a client machine with access to one or more web services over a network comprising:
an asynchronous communications interface to store a first web service description file describing how to interact with a web service using asynchronous communications;
a conversion engine configured to translate the first web service description file into a second web service description file, the second web description file describing how to interact with the web service using synchronous communications, the conversion engine situated on one or more computing devices; and a synchronous communications interface to receive a request from the client machine to use synchronous communications between the client machine and the web service and to provide the second web service description file to the client machine.

10. The integration services network of claim 9, wherein providing the second web service description file to the client machine to define interaction with the web service includes providing data for generation of client machine code to interact with the at least one web service.

11. The integration services network of claim 9, wherein one or more conversion engines are further configured to facilitate communication between the client machine and the web service via the one or more conversion engines, to communicate asynchronously with the first web service in accordance with the first web service description file, and to communicate synchronously with the first client machine in accordance with the second web service description file.

12. The integration services network of claim 11, wherein facilitating communications between the first client machine and the first web service comprises:

receiving a synchronous request from the client machine in accordance with the second description, and converting the synchronous request to an asynchronous message for transmission to the first web service in accordance with the first description.

13. The integration services network of claim 9, the network further comprising:

a directory stored in a central repository comprising one or more computing devices, the directory mapping an identity for each of a plurality of users to a policy framework which defines access information relating to the one or more web services.

14. The integration services network of claim 13, wherein the network is configured to facilitate messaging and mediate policy differences among a plurality of users and the one or more web services according to the policy framework.

15. The integration services network of claim 13, wherein the central repository is configured to store one or more web service description files for one or more of the web services, the central repository storing at least the first and second web service description files.

16. The integration services network of claim 9, wherein translating the first web service description file to the second web service description file includes one or more of the following operations:

translating a types part of the first web service description file into a types part of the second web service description file, translating a message part of the first web service description file into a message part of the second web service description file, translating a port type part of the first web service description file into a port type part of the second web service description file, translating a bindings part of the first web service description file into a bindings part of the second web service description file, and translating a service part of the first web service description file into a service part of the second web service description file.

17. One or more non-transitory computer readable media having instructions stored thereon for selectively accessing one or more web services from a client machine, the one or more web services and the client machine being accessible over a network, the instructions comprising:

a first instruction to store, at a host, a first web service description file describing how to interact with a web service using asynchronous communications, the web service being accessible via the host;

a second instruction to translate, at the host, the first web service description file into a second web service description file describing how to interact with the web service using synchronous communications;

a third instruction to receive, at the host, a request from the client machine to use synchronous communications between the client machine and the web service; and a fourth instruction to provide, to the client machine, the second web service description file.

18. A computer-implemented method for selectively accessing one or more web services from a client machine, the one or more web services and the client machine being accessible over a network, the method comprising:

storing, at a host, a first web service description file describing how to interact with a web service using synchronous communications, the web service being accessible via the host;

translating, at the host, the first web service description file into a second web service description file describing how to interact with the web service using asynchronous communications;

receiving, at the host, a request from the client machine to use asynchronous communications between the client machine and the web service; and providing, to the client machine, the second web service description file.

19. The computer-implemented method of claim 18, wherein providing the second web service description file to the client machine to define interaction with the web service includes providing data for generation of client machine code to interact with the at least one web service.

20. The computer-implemented method of claim 18, further comprising:

facilitating communication between the client machine and the web service via one or more conversion engines, the one or more conversion engines configured to communicate synchronously with the first web service in accordance with the first web service description file, the one or more conversion engines configured to communicate asynchronously with the first client machine in accordance with the second web service description file.

21. The computer-implemented method of claim 20, wherein facilitating communications between the first client machine and the first web service comprises:

receiving an asynchronous request from the client machine in accordance with the second description, and converting the asynchronous request to a synchronous message for transmission to the first web service in accordance with the first description.

22. The computer-implemented method of claim 18, the method further comprising:

storing a directory in a central repository, the directory mapping an identity for each of a plurality of users to a policy framework which defines access information relating to the one or more web services.

23. The computer-implemented method of claim 22, wherein the network comprises an integration services network configured to facilitate messaging and mediate policy differences among a plurality of users and the one or more web services according to the policy framework.

24. The computer-implemented method of claim 22, wherein the central repository is configured to store one or more web service description files for one or more of the web services, the central repository storing at least the first and second web service description files.

25. The computer-implemented method of claim 18, wherein translating the first web service description file to the second web service description file includes one or more of the following operations:
- translating a types part of the first web service description file into a types part of the second web service description file,
- translating a message part of the first web service description file into a message part of the second web service description file,
- translating a port type part of the first web service description file into a port type part of the second web service description file,
- translating a bindings part of the first web service description file into a bindings part of the second web service description file, and
- translating a service part of the first web service description file into a service part of the second web service description file.

26. An integration services network for providing a client machine with access to one or more web services over a network comprising:
- a synchronous communications interface to store a first web service description file describing how to interact with a web service using synchronous communications;
- a conversion engine to translate the first web service description file into a second web service description file, the second web description file describing how to interact with the web service using asynchronous communications, the conversion engine situated on one or more computing devices; and
- an asynchronous communications interface to receive a request from the client machine to use asynchronous communications between the client machine and the web service and to provide the second web service description file to the client machine.

27. The integration services network of claim 26, wherein providing the second web service description file to the client machine to define interaction with the web service includes providing data for generation of client machine code to interact with the at least one web service.

28. The integration services network of claim 26, wherein one or more conversion engines are further configured to facilitate communication between the client machine and the web service via the one or more conversion engines, to communicate synchronously with the first web service in accordance with the first web service description file, and to communicate asynchronously with the first client machine in accordance with the second web service description file.

29. The integration services network of claim 28, wherein facilitating communications between the first client machine and the first web service comprises:
- receiving an asynchronous request from the client machine in accordance with the second description, and
- converting the asynchronous request to a synchronous message for transmission to the first web service in accordance with the first description.

30. The integration services network of claim 26, the network further comprising:
- a directory stored in a central repository comprising one or more computing devices, the directory mapping an identity for each of a plurality of users to a policy framework which defines access information relating to the one or more web services.

31. The integration services network of claim 30, wherein the network is configured to facilitate messaging and mediate policy differences among a plurality of users and the one or more web services according to the policy framework.

32. The integration services network of claim 30, wherein the central repository is configured to store one or more web service description files for one or more of the web services, the central repository storing at least the first and second web service description files.

33. The integration services network of claim 26, wherein translating the first web service description file to the second web service description file includes one or more of the following operations:
- translating a types part of the first web service description file into a types part of the second web service description file,
- translating a message part of the first web service description file into a message part of the second web service description file,
- translating a port type part of the first web service description file into a port type part of the second web service description file,
- translating a bindings part of the first web service description file into a bindings part of the second web service description file, and
- translating a service part of the first web service description file into a service part of the second web service description file.

34. One or more non-transitory computer readable media having instructions stored thereon for selectively accessing one or more web services from a client machine, the one or more web services and the client machine being accessible over a network, the instructions comprising:
- first instructions to store, at a host, a first web service description file describing how to interact with a web service using synchronous communications, the web service being accessible via the host;
- second instructions to translate, at the host, the first web service description file into a second web service description file describing how to interact with the web service using asynchronous communications;
- third instructions to receive, at the host, a request from the client machine to use asynchronous communications between the client machine and the web service; and
- fourth instructions to provide, to the client machine, the second web service description file.

* * * * *